UNITED STATES PATENT OFFICE.

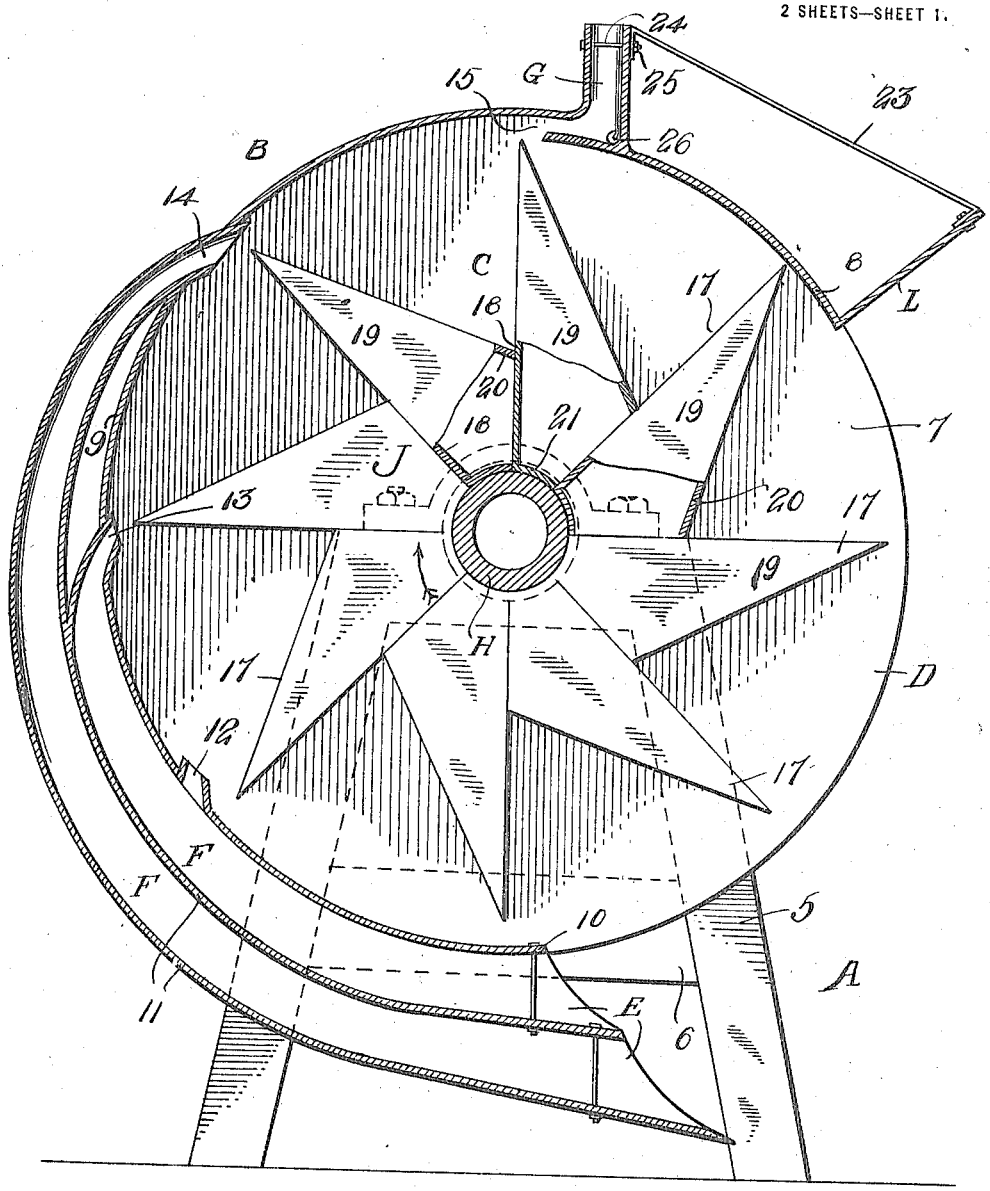

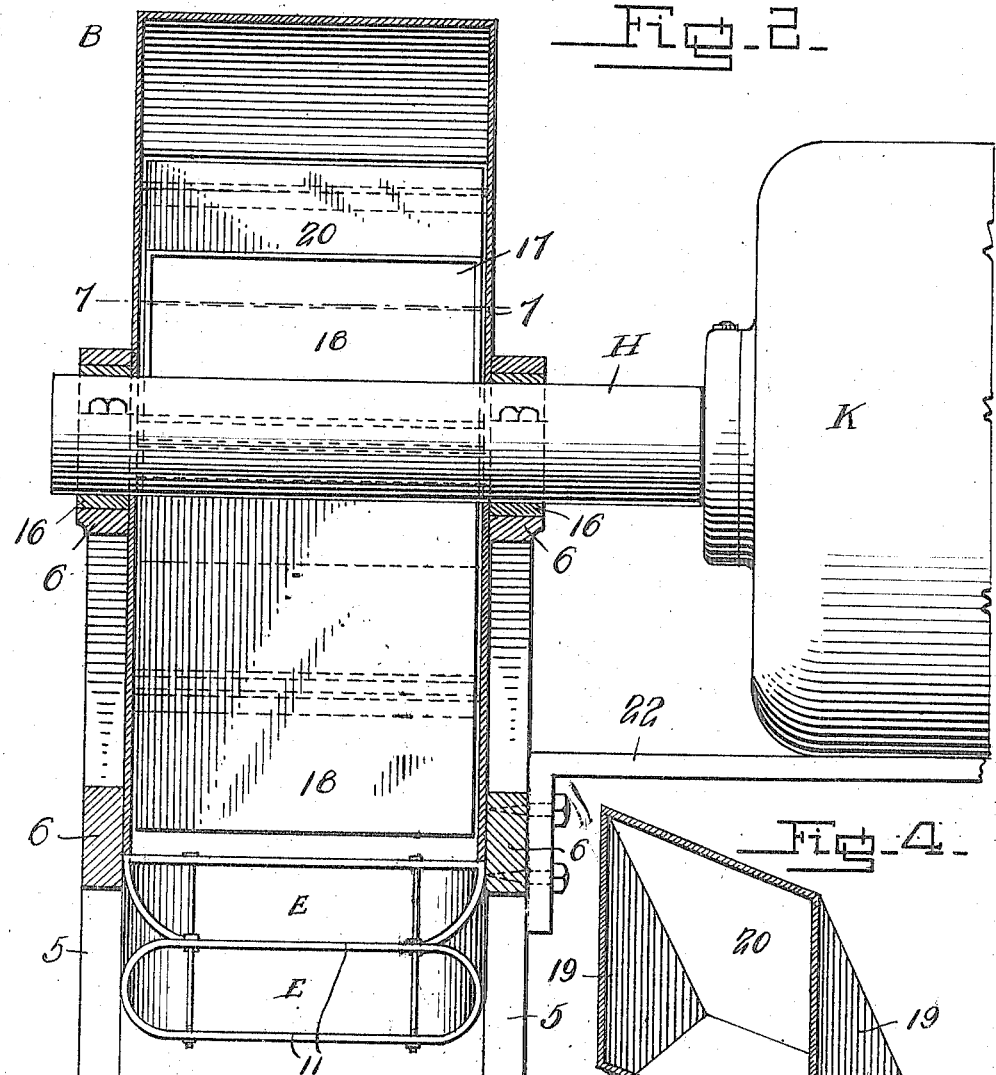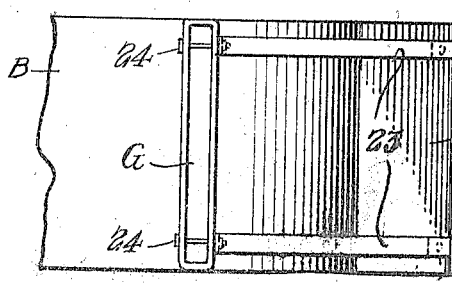

CHARLES H. WINNE, OF TROY, NEW YORK, ASSIGNOR OF NINETEEN ONE-HUNDREDTHS TO FREDERICK C. CLAESSENS AND TWENTY-FIVE ONE-HUNDREDTHS TO CARRIE TIFFT, BOTH OF TROY, NEW YORK.

AIR-OPERATED MOTOR.

1,263,983.  Specification of Letters Patent.  Patented Apr. 23, 1918.

Application filed September 22, 1916. Serial No. 121,639.

*To all whom it may concern:*

Be it known that I, CHARLES H. WINNE, a citizen of the United States, and a resident of Troy, in the county of Rensselaer and State of New York, have invented certain new and useful Improvements in Air-Operated Motors, of which the following is a specification.

My present invention relates to motors embodying a casing and an air impelled rotor.

The principal objects of my invention are to provide a motor which may be mounted upon a moving object, such as a railway car, boat, aeroplane, etc., or on a stationary object, such as a building or tower, at a point where wind is prevalent, the ingress of the motor facing the wind, and the motor capable of operating an electric generator or other machine; and, to provide a motor of the character described which is compact, simple in construction, and capable of collecting a maximum amount of air in motion consistent with its size.

Other objects of my invention are to provide a motor of the character described which is not apt to deteriorate due to exposure in inclement weather, and which is so constructed that a draft is provided within the casing of the rotor reducing back pressure and assisting in impelling the rotor.

Further objects of my invention will appear in the following detailed description, taken in connection with the accompanying drawings, forming a part of this specification, and in which drawings:—

Figure 1 is a view partly in central vertical section and partly in elevation through a motor constructed according to my invention.

Fig. 2 is a central vertical transverse sectional view through the motor, showing an electric generator in operative relation thereto.

Fig. 3 is a top plan view of a portion of the casing of said motor.

Fig. 4 is a perspective view of a vane, one face being removed to disclose details.

In the drawings, where similar characters refer to similar parts throughout the views, A designates a support; B a casing formed to provide a drum-like hollow C; major ingress opening D and minor ingress opening E to face the prevailing winds, ways F leaving from openings E, causing the air currents to retrovert and enter the hollow C in tangential relation to its wall, and a flue G; H a shaft extending transversely through casing B; J a rotor carried by said shaft; K a machine, such as an electric generator operated by shaft H; and, L a deflector.

Referring first to the support A, in the example shown, it comprises uprights 5 and cross members 6, it being understood that the support as shown, is merely by way of example for the motor may be mounted on a moving or stationary object, in any suitable manner, so as to bodily resist wind forces.

As to the casing B, it includes side walls 7, a front wall 8 provided with major ingress D, and a rear wall 9. The opening D preferably extends from the bottom of wall 9 from a point as indicated at 10 in the drawings, upwardly, and in the example shown, preferably two-thirds of the height of the hollow C. Conduits 11 providing the ways F may act in conjunction with the rear wall 9, in confining the current of air to a path leading from the minor ingress openings E of said conduits, preferably below the casing B to egress openings 12, 13, and 14, at the rear of the hollow C. These conduits 11 are preferably arcuated and follow the curvature of the wall 9, are formed to cause the current of air to retrovert and enter the hollow C in tangential relation to its rear wall.

The flue G extends from the upper portion of the casing B and is open to the upper portion of hollow C, as shown at 15. Thus, the prevailing winds in passing over the flue G will cause a draft or suction from within the hollow C.

The shaft H extends transversely through the casing A and may be supported by bearings 16 carried by cross members 6 of support A.

As to the rotor J, it may be of any suitable construction, but it is preferred to form the same of a plurality of vanes 17, said vanes made of sheet metal, or other suitable material to provide a plate 18 against which the air impinges, side plates 19 and a bracing plate 20 intermediate the side plates 19 and converging with plate 18, remote from the shaft H. The plate 18 may be provided with an arcuate strip 21, adapted to be secured to the shaft H in any suitable manner, such as by soldering. In assembling the vanes into operative relation to the shaft, they are arranged with the bracing plate 20 engaging the plate 18 of the advanced vane, as is clearly shown in Fig. 1 of the drawings.

Shaft H may be operatively connected with the machine K in any suitable manner, it being understood that the motor may be used for various purposes, such as for the generating of an electric current, for pumping, etc. In the example shown, the electric generator K is supported by a bracket 22 extending from one of the cross members 6 of support A.

The deflector L is arranged at the upper margin of major opening D, preferably, extending diagonally therefrom, and may be braced by a rod or rods 23, extending from the free end portion of the deflector and secured to the casing B in any suitable manner,—in the example shown, by means of bolts 24 and nuts 25, the former extending through flue G.

The operation of the motor is as follows:—

Assuming that it is arranged so that the ingress openings D and E face the prevailing winds, the air current will impinge upon the vanes primarily at the front of the motor, entering the hollow C of casing B through the major opening D. Such air currents as impinge upon the deflector L will be guided toward the vanes 17 of the rotor J so as to impel it in the direction indicated by arrow in Fig. 1 of the drawings.

To avoid back pressure in the casing, it is preferred to arrange only that portion of the wall of the casing between the ingress of flue G and the upper margin of opening D in close proximity to the vanes 17 of rotor J. Any air currents which are deflected from the plates 18 of vanes 17 are caught by the air current entering minor ingress opening E which passes through way F, and enter the hollow C in a manner to assist in impelling the rotor J in the direction indicated by the arrow. The draft created in flue G assists in moving the rotor on and provides a ready escape for air currents after they have served their purpose in impelling the rotor.

It is to be observed that the motor may be exposed to inclement weather and any rain or moisture falling will not enter the ways F. If desired, a perforation 26 may be provided in flue G for the escape of water which may enter the same. Should any water accumulate in the casing B on the walls thereof, it may find ready egress by flowing from the casing at the bottom of opening D or through the ways F.

Changes in details may be made without departing from the spirit or scope of my invention; but,

I claim:—

1. An air operated motor comprising in combination, a casing formed to provide a drum-like hollow, a major and minor ingress openings for the air to face the prevailing winds, and ways leading from said minor openings, causing the currents of air to retrovert and enter the said hollow at the rear thereof, and in a direction tangential to its wall, and a rotor in the said hollow of said casing including vanes impinged upon by the air entering said hollow to impel the rotor.

2. An air operated motor comprising in combination, a casing formed to provide a drum-like hollow, a major and minor ingress openings for the air to face the prevailing winds, ways leading from said minor openings, causing the currents of air to retrovert and enter the said hollow at the rear thereof and in a direction tangential to said wall, and a flue open to said hollow intermediate the openings of said ways thereinto and said major opening, and a rotor in said casing.

3. In an air operated motor, the combination of a casing formed to provide a drum-like hollow open at its front wall from the bottom upwardly providing a major ingress for the air, a conduit providing a way for the currents of air arranged with its ingress opening facing the prevailing winds below said casing and arcuated to cause the air to retrovert and enter the said hollow of said casing at its rear wall opposite to that comprehending said major ingress, in tangential relation to the wall of said hollow, and a rotor in said casing.

4. In an air operated motor, the combination of a casing formed to provide a drumlike hollow open at its front wall from the bottom upwardly providing a major ingress for the air, a conduit providing a way for the currents of air arranged with its ingress opening facing the prevailing winds below said casing and arcuated therefrom following the curvature of the wall of said casing and entering the same at a point in its rear wall opposite to that comprehending said major opening to cause the air to retrovert and enter the casing in tangential relation to the interior of the wall of said hollow, and a rotor in said casing.

5. In an air operated motor, the combination of a casing formed to provide a drumlike hollow open at its front wall from the bottom upwardly providing a major ingress for the air, a deflector arranged to carry air to said major opening, a conduit providing a way for the currents of air arranged with its ingress facing the prevailing winds below said casing and arcuated to cause the air to retrovert and enter the said hollow of said casing at its rear wall opposite to that comprehending said major ingress, in tangential relation to the wall of said hollow, and a rotor in said casing.

6. In an air operated motor, the combination of a casing formed to provide a drum-like hollow open at its front wall from the bottom upwardly providing a major ingress for the air, a flue open to the top of said hollow, a conduit providing a way for the currents of air arranged with its ingress opening facing the prevailing winds below said casing and arcuated to cause the air to retrovert and enter the said hollow of said casing at its rear wall opposite to that comprehending said major ingress, in tangential relation to the wall of said hollow, and a rotor in said casing.

7. In an air operated motor, the combination of a casing formed to provide a drum-like hollow open at its front wall from the bottom upwardly providing a major ingress for the air, a flue open to the top of said hollow, a conduit providing a way for the currents of air arranged with its ingress opening facing the prevailing winds below said casing and arcuated to cause the air to retrovert and enter the said hollow of said casing at its rear wall opposite to that comprehending said major ingress, in tangential relation to the wall of said hollow, and a rotor in said casing, the arcute face of the wall of said hollow between said flue opening and major ingress opening being closer to the vanes of said rotor than the arcuate face of the wall between the bottom of said major ingress and said flue.

8. An air operated motor comprising in combination, a casing formed to provide a drum-like hollow, a major and a minor ingress opening for the air to face the prevailing winds, and a way leading from said minor opening, causing the currents of air to retrovert and enter the said hollow at the rear thereof, and in a direction tangential to its wall, and a rotor in the said hollow of said casing including vanes impinged upon by the air entering said hollow to impel the rotor.

9. In an air operated motor, the combination of a casing formed to provide a drum-like hollow open at its front wall providing a major ingress for the air, a conduit providing a way for the currents of air arranged with its ingress opening facing the prevailing winds and arcuated to cause the air to retrovert and enter the said hollow of said casing at its rear wall opposite to that comprehending said major ingress, in tangential relation to the wall of said hollow, and a rotor in said casing.

CHARLES H. WINNE.